H. STINEMETTS.
TIRE RIM.
APPLICATION FILED MAY 24, 1918.
1,327,180.
Patented Jan. 6, 1920.
2 SHEETS—SHEET 1.
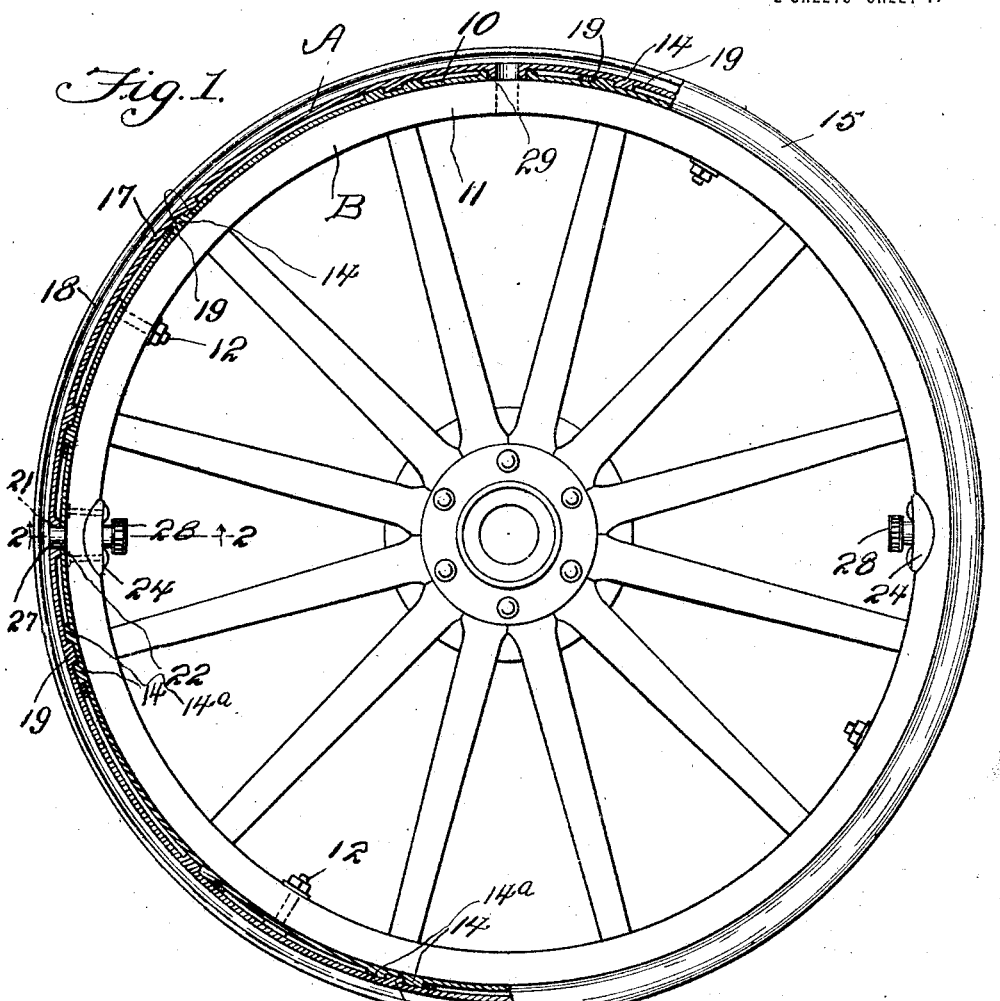
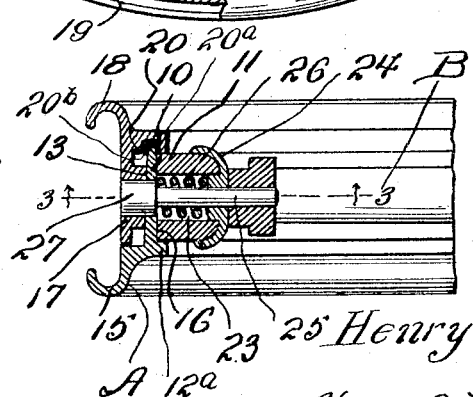
Witnesses
J. L. Wright
F. Hough
Inventor
Henry Stinemetts
By Victor J. Evans
Attorney

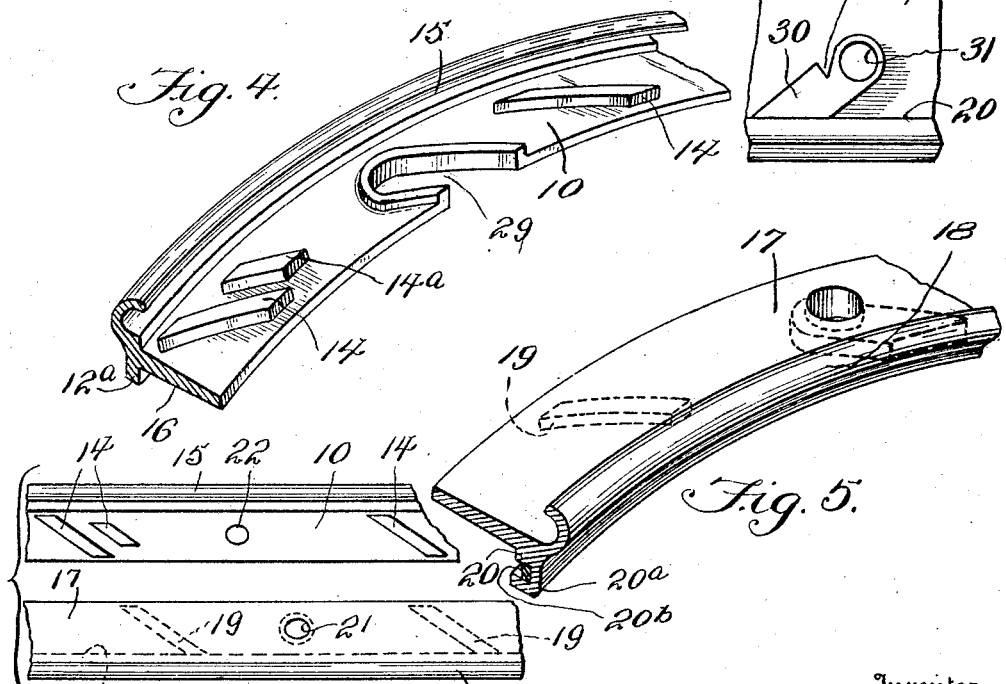

UNITED STATES PATENT OFFICE.

HENRY STINEMETTS, OF CALGARY, ALBERTA, CANADA.

TIRE-RIM.

1,327,180.   Specification of Letters Patent.   Patented Jan. 6, 1920.

Application filed May 24, 1918. Serial No. 236,349.

*To all whom it may concern:*

Be it known that I, HENRY STINEMETTS, citizen of United States of America, residing at Calgary, in the Province of Alberta, Dominion of Canada, have invented new and useful Improvements in Tire-Rims, of which the following is a specification.

This invention relates to a tire rim which is primarily intended for use in connection with the tires of motor-vehicles such as automobiles and the like.

The primary object of the invention is to so improve the rim of this character disclosed in Patent No. 1,223,635 which I obtained from the United States on April 24, 1917, that the rim may not only be applied to the wheels of motor-vehicles without alterations thereto, but the outer rim section may be more effectively locked against turning or lateral movement on the inner rim section possible in the rim which I am now manufacturing.

With these and other objects in view the invention resides in the novel combination and arrangement of parts which will be hereinafter described and claimed.

Figure 1 is a view in side elevation partly in section of the improved rim and showing the same mounted upon the wheel of a motor-vehicle.

Fig. 2 is an enlarged vertical transverse section in the line 2—2 of Fig. 1.

Fig. 3 is a section on the line 3—3 of Fig. 2.

Fig. 4 is a perspective view of a portion of the inner rim section.

Fig. 5 is a view similar to Fig. 4 of the outer rim section.

Fig. 6 is a fragmentary plan view of both rim sections showing the lock member receiving holes therein, and Fig. 7 is a fragmentary plan view showing the underside of the outer rim section and showing the plate for filling the valve stem receiving slot in the inner rim section.

Like characters of reference denote the corresponding parts throughout the various views in the drawings.

Referring now to the drawings in detail the letter A, designates the improved rim which is shown applied to the wheel B, of a motor-vehicle. The rim A as in the above mentioned patent includes an inner rim section 10 which is fixed to the felly 11 of the wheel B by bolts 12, and which is provided with a flange $12^a$ abutting against the side of the felly. This section is provided with an inclined outer peripheral face 13 upon which are formed diagonally extending lugs 14 and $14^a$. The inner rim section 10 has formed thereon at one side of the section a continuous and curved tire engaging flange 15.

To permit the improved rim A to be applied to the fellies of wheels now in use upon motor-vehicles without altering the shape of the fellies, I form the inner rim section 10 with a straight inner peripheral face 16, and this feature of the improved rim I consider renders the rim more commercially desirable than are the rims which I am now manufacturing under the protection of my aforementioned United States patent.

The outer section of the rim A is of a construction somewhat similar to the outer rim section in the above mentioned patent and comprises a band 17 provided at one side with a continuous tire engaging flange 18 and upon its inner peripheral face with spaced diagonally extending lugs 19 which engage between the lugs 14 and $14^a$ when the rim sections are in tire clamping position. It will be noted that the lugs $14^a$ are provided adjacent each third lug 14 and all the lugs are so disposed as to be over the ends of the spokes. Where the lugs $14^a$ are absent, the lugs 19 will engage only against the lugs 14.

The inner rim section 17 is provided with a continuous flange 20 which abuts against the outer ends of the lugs 14 when the sections are connected with each other and prevents foreign matter from entering the space between the rim sections. The outer section is further provided with an inwardly extending grooved flange $20^a$ in which is disposed a gasket $20^b$ engaging the outer edge of the inner section when the sections are assembled. The outer rim section has formed therein at diametrical points elliptical shaped openings 21 which when the rim sections are engaged with each other register with similarly shaped openings 22 in the inner rim section 10.

The openings 22 register with circular openings 23 in the felly 11 having greater diameters than the major axes of the elliptical openings 21 and 22 in the rim and one end of each of the openings 23 is closed by a plate 24 suitably secured to the felly. Arranged within the openings 23 and extending beyond the plates 24 through suitable openings therein are locking pins 25 upon which are mounted coil expansion springs 26 arranged in the openings 23 to bear upon the plates 24 and the heads 27 of the pins 25. The heads 27 of the pins 25 correspond in shape in cross section to the shape of the openings 21 and 22 into which said heads normally extend to lock the outer rim section against withdrawal from the inner rim section. The portions of the pins 25 which extend beyond the plates 24 have fixed thereto milled collars 28 which are yieldably held in engagement with the plates 24 by the springs 26, so that the pins 25 may be manually moved longitudinally of the openings 23 to withdraw the heads 27 from the openings 21 and 22. When the heads on the pins 25 have been withdrawn from the above mentioned openings it is obvious that by partially rotating the pins 25, the pins may be turned to a position within the openings 23 in which the heads 27 will be held in engagement with the inner rim section 10 while the outer rim section is withdrawn from the inner rim section.

The inner section 10 is provided with a diagonally extending valve stem opening 29 which receives a plate 30 of the same size and shape disposed upon the under side of the section 17. This plate is secured to the section 17 and is provided with a hole 31 which engages upon the valve stem of the tire. The purpose of the plate is to fill the opening 29 so as to exclude dirt. The plate 30 is further provided with a notch 32 in which a suitable tool may be engaged for prying the plate out of the opening 29 when desired.

From the foregoing description and a study of the drawings it will be apparent that I have thus provided a very efficient and practical rim the parts of which may be readily assembled and disassembled, the construction being such that the parts may be firmly held in position with such security that danger of accidental derangement will be reduced to the minimum.

Having thus described my invention what is claimed as new, is:—

1. A separable rim comprising an inner section having its inner periphery cylindrical for engagement upon the outer periphery of a felly, said section being secured to the felly, an inwardly extending flange formed at one edge of said section and engaging against the side of the felly, an outwardly extending tire engaging flange formed on said edge of said section, the outer periphery of said section being inclined, a plurality of pairs of spaced lugs extending diagonally across said outer periphery, an outer section having its inner periphery inclined and its outer periphery cylindrical, an inwardly extending flange formed on one edge of said outer section and abutting against the ends of said lugs to form a closure for the side of the rim, said last named flange being grooved for the reception of the free edge of said first named section, a gasket within said groove, a tire engaging flange formed on said edge of said outer section, a plurality of lugs extending diagonally across the inner periphery of said outer section and engaging between said pairs of lugs, and means for securing said outer section against movement with respect to said inner section.

2. A separable rim comprising an inner section secured upon the outer periphery of a felly, a series of lugs arranged in pairs and extending diagonally across the outer periphery of said section, a second series of single lugs extending diagonally across the outer periphery of said section in spaced parallel relation to and in alternation with said pairs of lugs, an outer section disposed upon said inner section, a plurality of lugs extending diagonally across the inner periphery of said outer section and engaging between said pairs of lugs and against said single lugs, respectively, tire engaging flanges formed on opposite edges of said sections, and means for securing said outer section against movement with respect to said inner section.

3. A separable rim comprising an inner section secured upon the outer periphery of a felly, an outer section disposed upon said inner section, means for preventing relative circumferential movement of said sections, both of said sections being provided with holes of elliptical shape, said holes being in registration when said sections are assembled, said felly being provided with a plurality of circular holes registering with said elliptical holes and having a diameter equal to the major axis of the elliptical holes, a plate closing the inner end of each circular hole and provided with a central opening, and an outwardly spring pressed plunger slidable through each opening and having its outer end formed as an elliptical head conformingly engaging within said elliptical holes, said plunger being rotatable when said head is withdrawn from engagement within said elliptical holes whereby upon subsequent release of said plunger the ends of said head will engage against the inner periphery of said inner section at the sides of the elliptical hole therein for holding said plunger in retracted position.

In testimony whereof I affix my signature.

HENRY STINEMETTS.